United States Patent [19]

Iwata et al.

[11] 4,408,104
[45] Oct. 4, 1983

[54] LEVER SWITCH ARRANGEMENT FOR MOTOR VEHICLE

[75] Inventors: Masayosi Iwata, Hashima; Kenshi Furuhashi, Nagoya; Hiroyasu Ito, Ichinomiya, all of Japan

[73] Assignee: Kabushiki Kaisha Tokai Rika Denki Seisakusho, Aichi, Japan

[21] Appl. No.: 358,603

[22] Filed: Mar. 15, 1982

[30] Foreign Application Priority Data

Mar. 27, 1981 [JP] Japan .............................. 56-43896[U]

[51] Int. Cl.³ ............................................. H01H 9/16
[52] U.S. Cl. .............................. 200/61.54; 200/61.27; 200/311; 200/313
[58] Field of Search ............... 200/61.54, 61.27–61.38, 200/308–317

[56] References Cited

U.S. PATENT DOCUMENTS

| 1,653,517 | 12/1927 | Smith | 200/61.27 X |
| 4,328,431 | 5/1982 | Usami | 200/61.54 |

FOREIGN PATENT DOCUMENTS

| 2726521 | 12/1978 | Fed. Rep. of Germany ... 200/61.54 |
| 55-136114 | 9/1980 | Japan . |
| 56-1339 | 1/1981 | Japan . |

*Primary Examiner*—A. T. Grimley
*Assistant Examiner*—Morris Ginsburg
*Attorney, Agent, or Firm*—Wenderoth, Lind & Ponack

[57] ABSTRACT

This disclosure is directed to an improved lever switch arrangement for use in a motor vehicle and the like, in which positions of a control lever are clearly indicated through illumination particularly at night for improved operability, while the illumination of the control lever positions is also utilized to display the state of functionings of switch members incorporated in the control lever.

9 Claims, 7 Drawing Figures

LEVER SWITCH ARRANGEMENT FOR MOTOR VEHICLE

BACKGROUND OF THE INVENTION

The present invention generally relates to an electrical switching arrangement and more particularly, to a lever switch arrangement for a turn signal switch or direction indicating switch, or the like which is installed on a steering shaft of a motor vehicle or the like.

Generally, in the lever switch arrangements of the above described type, since the position of the control lever is altered at each operation thereof, it is required that the lever switch arrangement include some means for clearly indicating the operating positions of the control lever, especially at night, for improvement of the operability. However, lever switch arrangements conventionally used for such purpose generally have a rather complicated structure, requiring a large number of parts, and consequent high cost, and have not necessarily been satisfactory from the viewpoints of reliability and efficient operation, and the like.

SUMMARY OF THE INVENTION

Accordingly, an essential object of the present invention is to provide a lever switch arrangement for use in a motor vehicle, in which positions of a control lever are clearly indicated by illumination for improved operability, particularly at night, while the illumination of the control lever positions is also utilized to display the functions of the switch members incorporated in the control lever, thereby providing an easily used construction.

Another important object of the present invention is to provide a lever switch arrangement of the above described type which has a simple construction and functions stably and with high reliability, and can be readily manufactured at low cost.

In accomplishing these and other objects and features of the present invention, there is provided a lever switch arrangement for use in a motor vehicle or the like, which comprises a base member i.e. a column body to be secured around a steering shaft of the motor vehicle, a control lever pivotally connected to the base member for operating switch means provided in the base member, a light transmitting member provided at an operating end of the control lever for transmitting light emitted from a light source, for example, in the form of a light emitting diode, a further switch means provided in the control lever, an operating member provided on the control lever for operating said further switch means and capable of being slidingly displaced for operation, for example, by a finger between one position where the operating member overlaps a predetermined portion of the light transmitting member for hiding the predetermined portion so that it is not visible to the operator and the other position where the predetermined portion of the light transmitting member is exposed, and a display portion provided at said predetermined portion of the light transmitting member for indicating the functioning of said further switch member for displaying functioning of said another switch means provided in the control lever.

By the arrangement according to the present invention as described above, there is provided an improved lever switch arrangement having a simple construction and high reliability, with substantial elimination of disadvantages inherent in the conventional arrangements of this kind.

BRIEF DESCRIPTION OF THE DRAWINGS

These and other objects and features of the present invention will become apparent from the following description of a preferred embodiment thereof taken in conjunction with the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
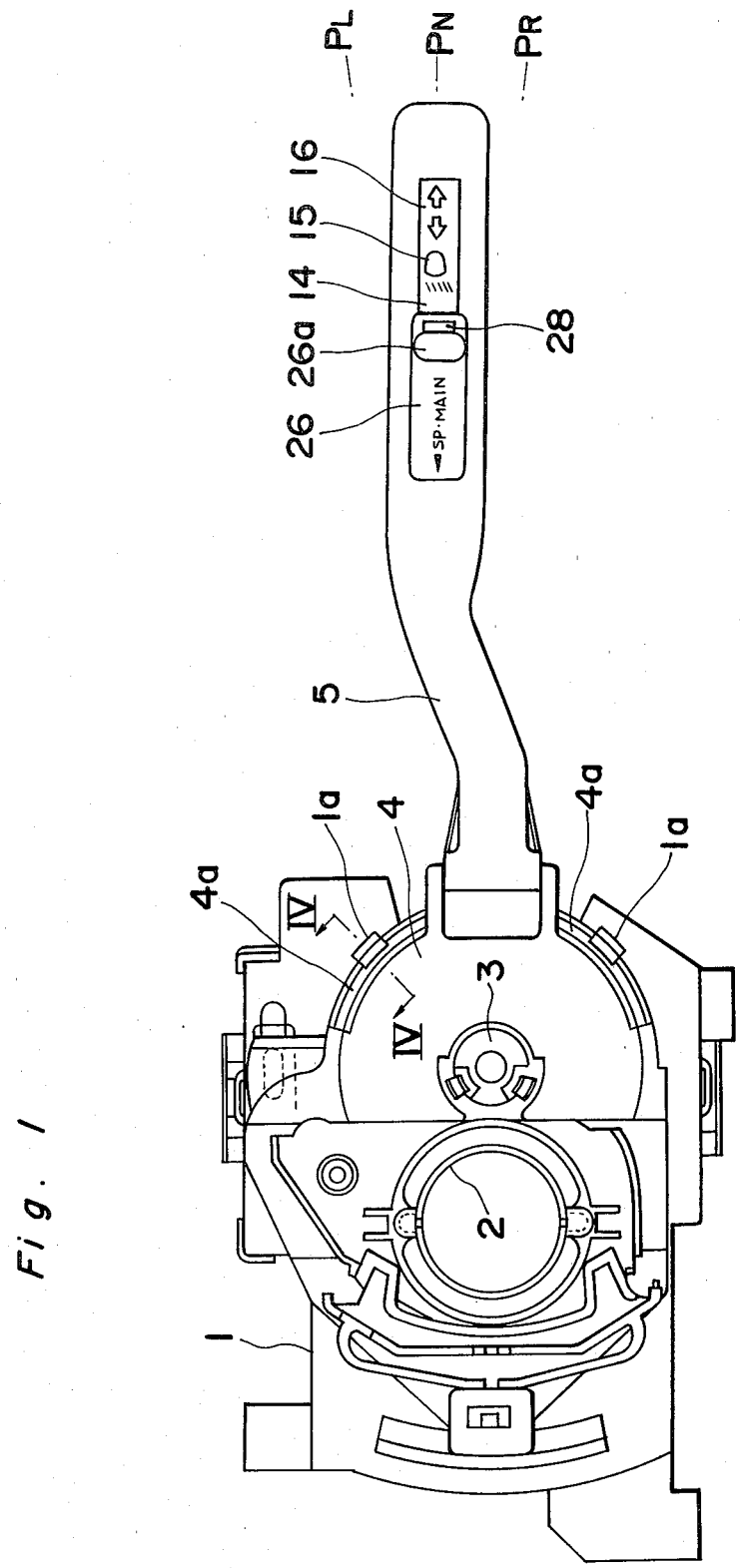
FIG. 1 is a top plan view of a lever switch arrangement according to one preferred embodiment of the present invention.
Figure 2:
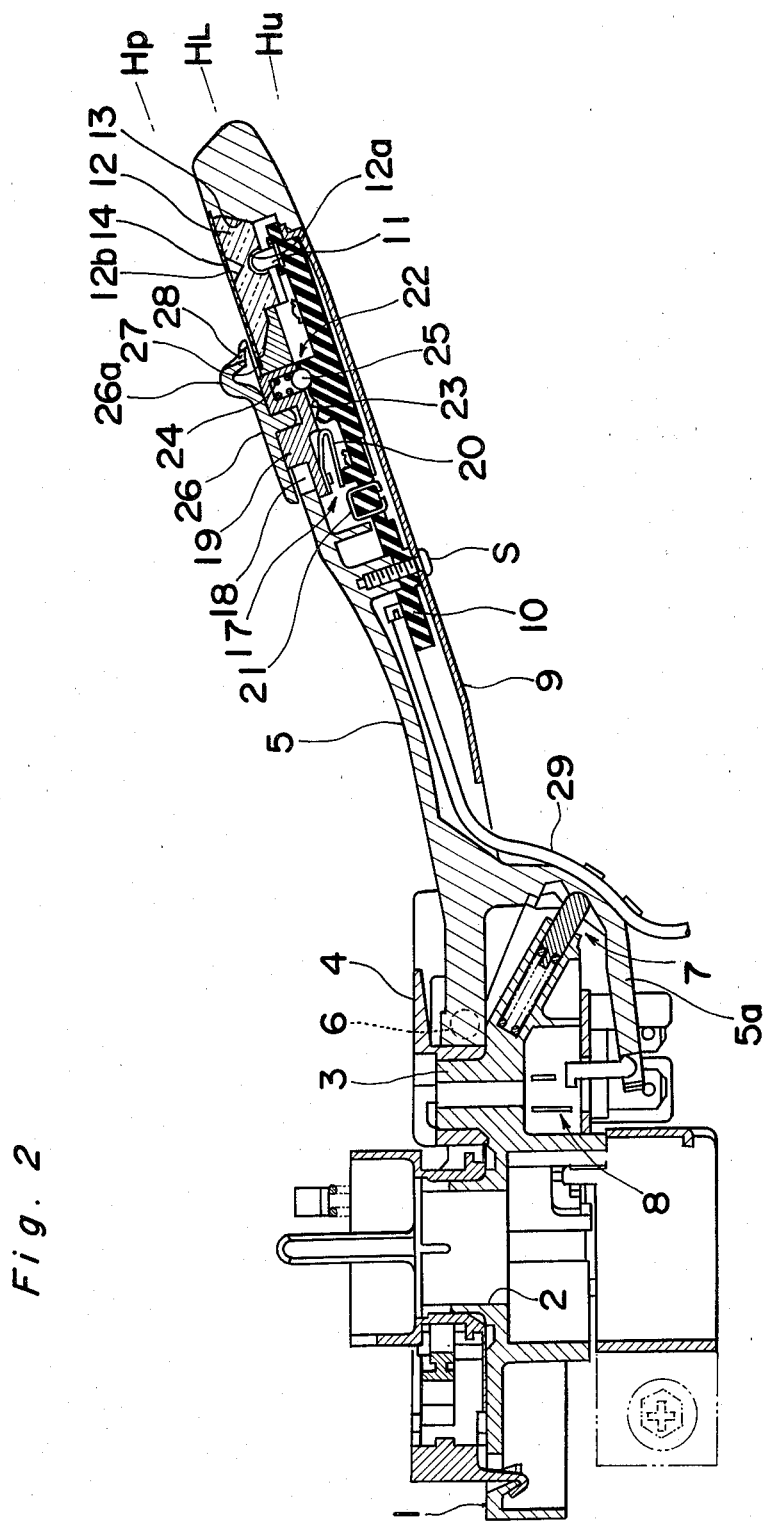
FIG. 2 is a side sectional view of the lever switch arrangement of FIG. 1.
Figure 3:
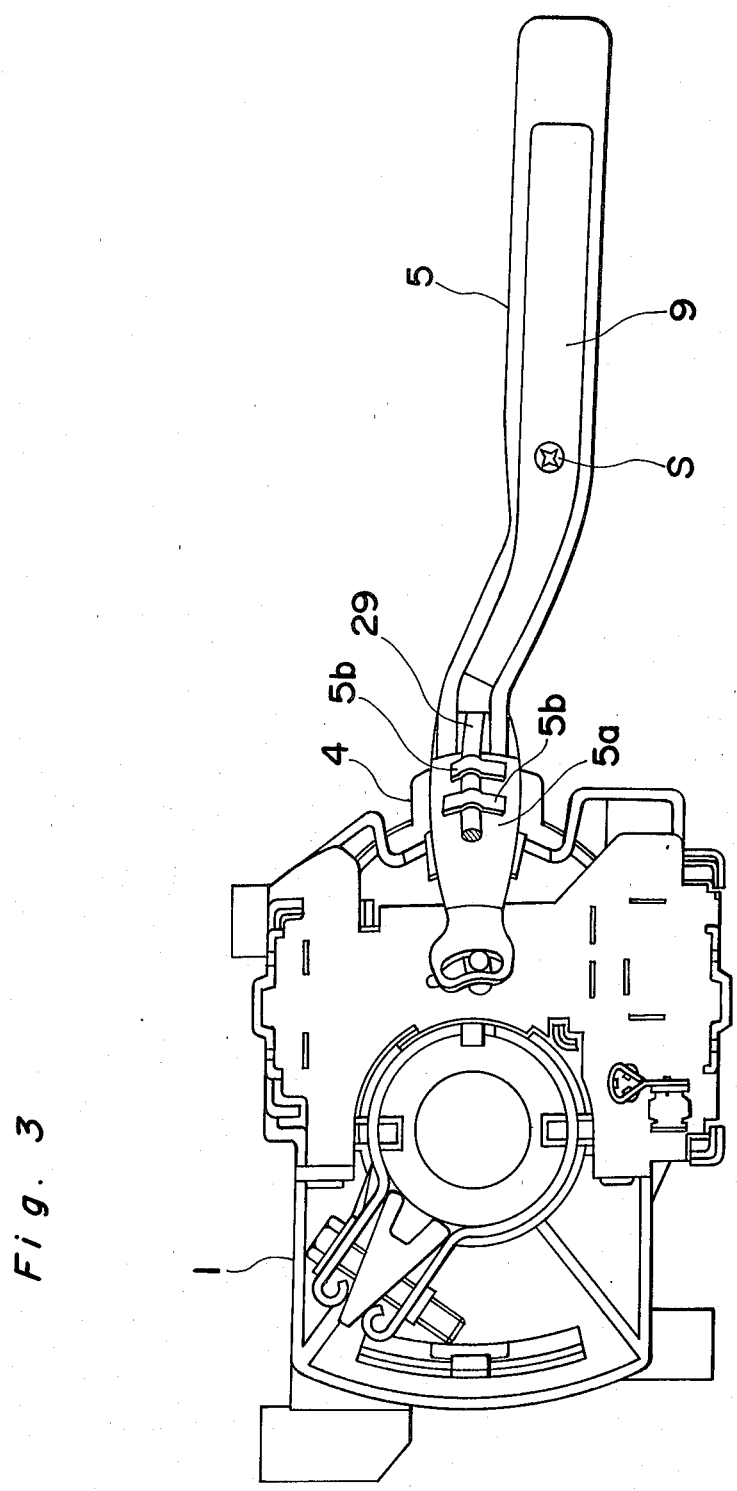
FIG. 3 is a bottom plan view of the lever switch arrangement of FIG. 1.
Figure 4:
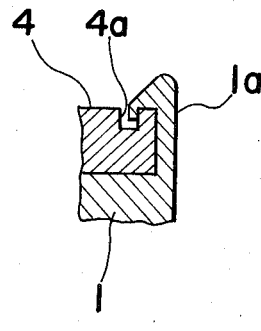
FIG. 4 is a fragmentary cross sectional view, on an enlarged scale, taken along the line IV—IV in FIG. 1.

Referring to the drawings, there is shown, in FIGS. 1 to 3, a lever switch arrangement according to one preferred embodiment of the present invention, which generally includes a column body 1 as a base member to be fitted onto a steering column (not shown) of a motor vehicle which extends through an opening 2 formed at the central portion, and a control lever 5 pivotally mounted on the column body 1 for movements in a horizontal direction in a vehicle (i.e. in a vertical direction in FIG. 1) and a vertical direction in a vehicle (i.e. in a vertical direction in FIG. 2) in a manner as described hereinbelow. The column body 1 is provided with a hollow stud or shaft 3 which extends upwardly therefrom, and around which a bracket 4 is pivotally mounted, and the control lever 5 is pivotally connected, at its one end, to said bracket 4 through an axis 6. The bracket 4 has, in a semi-circular peripheral edge portion, a groove 4a extending along said peripheral edge portion as is most clearly seen in FIG. 4, and resilient claw pieces 1a extending upwardly from the column body 1, fit into the groove 4a to prevent undesirable rising of the bracket 4.

In the above arrangement, rotation of the control lever 5 in the vertical direction in FIG. 2 is for producing, for example, a headlamp dimmer operation at a time of passing another vehicle, and the lever 5 is held in either a low beam position $H_L$ or a high beam position $H_U$ by a detent mechanism 7 for appropriately energizing head lamps (not shown), while the control lever 5 is also arranged to be automatically returned to the $H_L$ position after being moved from said position to the passing position $H_P$. On the other hand, when the lever 5 is operated in the vertical direction in FIG. 1 (i.e. in the horizontal direction in FIG. 2), it is rotated about the shaft 3 together with the bracket 4, which rotation is for producing operation of turn direction indicating lamps at the time of rightward or leftward turning of the motor vehicle, and the control lever 5 is adapted to be maintained, by a detent mechanism 7, at any one of a neutral position $P_N$, a right turn indicating position $P_R$ and a left turn indicating position $P_L$ shown in FIG. 1. In the column body 1, there are provided a dimmer switch 8 which is actuated in association with the dimmer operation of the control lever 5, and a turn signal switch (not shown) which is actuated in association with the direction indicating operation of the said lever 5.

The control lever 5 has a hollow interior open at its under side, which is normally closed by a cover 9 secured to the lever 5, for example, by a set screw S or the like. In the space in the hollow interior of the control lever 5, there is fixedly mounted an insulator 10 having, at its one end adjacent to the operating end portion of the lever 5, a light source, for example, a light emitting diode 11. The lever 5 has, in its upper surface adjacent to the operating end portion thereof, an opening 13, in which a lens 12 is fitted, and in the under face of the lens 12 is a semi-spherical recess 12a for covering the light emitting diode 11, while a V-shaped groove 12b is formed at the central portion in the upper face of said lens 12. Onto the upper face of the lens 12, there is further applied a light transmitting member 14 which is, for example, a translucent plastic sheet colored a predetermined color or shade of color, and marked, on its upper face, with indicia denoting the switches to be actuated by the lever 5, for example, a mark 15 in the shape of a headlamp indicating the dimmer switch and arrows 16 representing the turn signal switch. In the space within the control lever 5, there is further provided a main switch 17 for a constant speed running device (not shown) of the motor vehicle, and which includes a holder 19 guided for a sliding movement within an elongated opening 18 in the upper face of the control lever 5, a movable contact 20 fixed to the holder 19, and a stationary contact 21 secured to the insulator 10. The switch 17 is provided with a detent mechanism 22 therefor, which may have a known construction including concave and convex surfaces 23 formed in the insulator 10, and a detent ball 25 urged against the concave and convex surfaces 23 by a compression spring 24 provided in the holder 19. The holder 19 is maintained at either an OFF position as shown in FIG. 2 or an ON position illustrated in FIG. 6. A generally flat plate-like operating member 26 of an opaque material is connected to the holder 19 form one unit, for example by fitting a projection extending downwardly from the lower surface of the operating member 26 into a corresponding recess formed in the upper face of the holder 19, while a raised portion 26a of generally inverted U-shape cross section is formed adjacent to the right end portion of the operating member 26 for applying a finger thereto during operation thereof.

Figure 5:
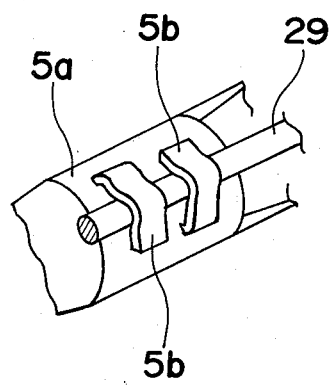
FIG. 5 is a fragmentary perspective view showing on an enlarged scale, a cord holding structure employed in the arrangement of FIG. 1.
Figure 6:
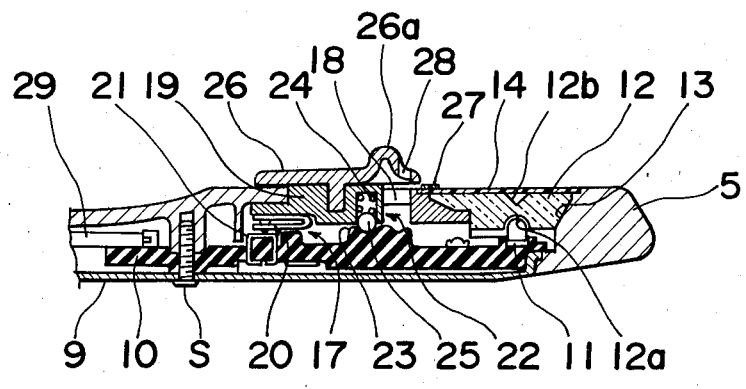
FIG. 6 is a fragmentary side sectional view of a control lever employed in the arrangement of FIG. 1, showing switch members incorporated therein in the ON state.
Figure 7:
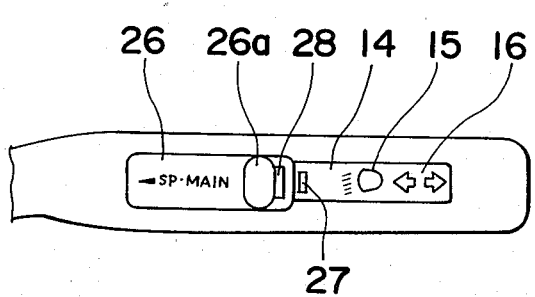
FIG. 7 is a top plan view of the control lever of FIG. 6.

The operating member 26 as described above is arranged to overlap a predetermined portion of the light transmitting member 14, i.e. the left end portion thereof as shown in FIG. 1 when the holder 19 is in the OFF position, and to expose said left end portion when the holder 19 is moved into the ON position. Meanwhile, the left end portion 27 of the light transmitting member 14 in FIG. 1 overlapped by the operating member 26 is colored different from the color or with a different shade of the same color as the light transmitting member 14 so as to serve as a display portion for displaying the ON condition of the switch 17. Alternatively a different colored piece can be placed on the light transmitting member at this point as shown in FIG. 6. In a portion near the raised portion 26a on the operating member 26, and corresponding to the display portion 27, is another lens 28 having a color different from or a different shade from that of the display portion 27. A cable 29 extends into the space within the control shaft 5 and is suitably secured, at its one end, to terminal means which in turn is connected to the light emitting diode 11 and the contacts 20 and 21 (actual connection not shown) to supply power to diode 11 and contact leads to contact 20 and 21, while the cable extending out of the lever 5 extends along the outer periphery of the projecting portion 5a extending downwardly in approximately an inverted L-shape from the base end of the lever 5, and is held by a pair of holding pieces 5b integral with the projecting portion 5a and extending in alternately different directions therefrom as shown in FIG. 5.

By the above arrangement, when small lamps such as tail lamps or parking lamps are lit, or head lamps are lit at the same time as the small lamps, power is supplied to the light emitting diode 11 and it is energized for being illuminated, and thus, the light transmitting member 14 receives light from the light emitting diode 11 through the lens 12 and allows the light to pass therethrough, and accordingly, the light transmitting member 14 is brightly illuminated for indicating the position of the operating end of the control lever 5. In the above case, if the holder 19 of the switch 17 is located in the OFF position, the driver can readily ensure that the switch 17 is in the OFF state, because the operating member 26 overlaps the leftward end portion of the light transmitting member 14 for hiding the display portion 27. Meanwhile, since the light transmitted through the leftwards end portion of the light transmitting member 14 is further transmitted through the lens 28 of the operating member 26, the lens 28 is brightly illuminated for indicating of the position of the raised portion 26a of said operating member 26. Upon sliding the operating member 26 towards the left in FIGS. 1 and 2 for setting the switch 17 to the ON state, the leftwards end portion of the light transmitting member 14 is exposed and the display portion 27 is exposed, and thus, the driver can readily see that the switch 17 is in the ON state by observing the display portion 27.

It should be noted here that, in the foregoing embodiment, the dimmer switch 8, and the like described as provided in the column body 1 may be replaced, for example, by a wiper control switch or the like, while the switch 17 described as accommodated in the control lever 5 may also be replaced by a main switch for the small lamps or head lamps, or the, if desired.

As is clear from the foregoing description, with the lever switch of the present invention, since the light transmitting member is brightly illuminated for indication of positions of the operating end of the control lever in cases where motor vehicles are driven at night, the operating positions of the control lever can be determined by visual examination, which facilitates operation of the vehicle, while because of the provision of the display portion for displaying the state of the switch incorporated in the control lever which is provided at the portion of the light transmitting member which in overlapped by the operating member for actuating said switch, upon actuation of said switch in the control lever by operation of the operating member, the display portion is exposed, and thus, it becomes possible also to display the state of the switch accommodated in the control lever by utilization of the light source for the lever position indication, thereby improving and making compact the structure of the lever switch arrangement.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A lever switch arrangement for use in a motor vehicle and the like, which comprises:
    a base member securable around a steering shaft of the motor vehicle and having switch means therein;
    a control lever pivotally connected to said base member for operating said switch means in said base member;
    a light source in said control lever;
    a light transmitting member on the outer end of said control lever for transmitting light from said light source;
    a further switch means provided in said control lever;
    an operating member provided on said control lever for operating said further switch means and being slidingly displaceable between a first position where said operating member overlaps a portion of said light transmitting member for hiding said portion from view and a second position where said operating member is out of overlapping relation with said portion of said light transmitting member so as to expose said portion; and
    a display means provided at said portion of said light transmitting member for indicating a functional condition of said further switch means when said portion of said light transmitting member is exposed.

2. A lever switch arrangement as claimed in claim 1 wherein said base member is a column body having a central opening through which the steering shaft passes when said body is secured around the steering shaft.

3. A lever switch arrangement as claimed in claim 1 wherein said lever is pivotable around two axes, one of which is generally parallel to the steering shaft when mounted thereon and the other of which is generally perpendicular thereto, and wherein said switch means in said base member includes a dimmer switch actuated by pivotal movement of said control lever around one of said axes and a turn signal switch actuated by pivotal movement of said control lever around the other of said axes.

4. A lever switch arrangement as claimed in claim 1 wherein said switch means in said base member includes a wiper control switch actuated by pivotal movement of said control lever.

5. A lever switch arrangement as claimed in claim 1 wherein said light transmitting member is a semi-transparent plastic sheet having a predetermined color or shade of color and is positioned on said control lever above said light source and having indicia thereon for indicating the switch means to be operated by the control lever, said portion of said light transmitting member having a color or a shade of color different from that of said light transmitting member for serving as said display means.

6. A lever switch arrangement as claimed in claim 5 wherein said light source is a light emitting diode in said control lever.

7. A lever switch arrangement as claimed in claim 1 wherein said further switch means includes a switch member for a constant speed running device of the motor vehicle.

8. A lever switch arrangement as claimed in claim 1 wherein said further switch means is a main switch for small lamps or head lamps.

9. A lever switch arrangement as claimed in claim 5 wherein said operating member has a raised finger engaging portion and has in the portion thereof on the part which overlaps said portion of said light transmitting member a further lens means with a color or shade of color different from that of said display means, whereby when said operating member is at said first position, light from said light source illuminates said further lens means for indicating such position of said operating member.

* * * * *